(12) United States Patent
Muukki et al.

(10) Patent No.: US 8,446,484 B2
(45) Date of Patent: May 21, 2013

(54) IMAGE PROCESSING ARCHITECTURE WITH PRE-SCALER

(75) Inventors: Mikko J. Muukki, Tampere (FI); Ossi M. Kalevo, Toijala (FI); Juha Sarkijarvi, Tampere (FI)

(73) Assignee: Nokia Corporation, Espoo (FI)

( * ) Notice: Subject to any disclaimer, the term of this patent is extended or adjusted under 35 U.S.C. 154(b) by 491 days.

(21) Appl. No.: 12/799,348

(22) Filed: Apr. 21, 2010

(65) Prior Publication Data

US 2011/0261217 A1 Oct. 27, 2011

(51) Int. Cl.
*H04N 5/228* (2006.01)
(52) U.S. Cl.
USPC .............. 348/222.1; 348/333.01; 348/333.02; 348/333.05
(58) Field of Classification Search
USPC .............................. 348/222.1, 333.01–333.08
See application file for complete search history.

(56) References Cited

U.S. PATENT DOCUMENTS

| 7,646,910 B1 | 1/2010 | Linzer ............................ 382/166 |
| 2006/0146144 A1 | 7/2006 | Salmelin et al. ............ 348/222.1 |
| 2006/0290792 A1 | 12/2006 | Nikkanen et al. ........... 348/240.2 |
| 2006/0290796 A1 | 12/2006 | Nikkanen et al. ............. 348/294 |
| 2007/0159642 A1 | 7/2007 | Choi ................................ 358/1.2 |
| 2007/0230827 A1 | 10/2007 | Haukijarvi et al. ........... 382/298 |
| 2008/0018660 A1 | 1/2008 | Nenonen et al. .............. 345/596 |
| 2008/0038865 A1* | 2/2008 | Kwon .............................. 438/73 |
| 2008/0316331 A1* | 12/2008 | Jun ............................. 348/222.1 |
| 2009/0016644 A1 | 1/2009 | Kalevo et al. ................. 382/298 |
| 2009/0268071 A1 | 10/2009 | Ahn ............................... 348/302 |

FOREIGN PATENT DOCUMENTS

WO  WO 2008/075136 A1  6/2008

OTHER PUBLICATIONS

"SMIA 1.0 Part I: Functional specification", Nokia Corporation, 2004, 195 pgs.

* cited by examiner

*Primary Examiner* — Yogesh Aggarwal
(74) *Attorney, Agent, or Firm* — Harrington & Smith

(57) ABSTRACT

Disclosed is an image signal processing chain or functionality having an image data scaler. A method includes receiving a stream of image data having a first resolution; scaling the received stream of image data using a substantially freely configurable downscaling ratio to generate scaled image data having a second resolution that is less than the first resolution; outputting the scaled image data to at least one of a viewfinder image signal processing functionality or a video image signal processing functionality to create image data for at least one of display to a user or provide to a video encoder; and during at least one of receiving, scaling or outputting, simultaneously storing the stream or a subset of the stream of image data having the first resolution into a memory as a set of frames of image data for being processed as needed.

26 Claims, 13 Drawing Sheets

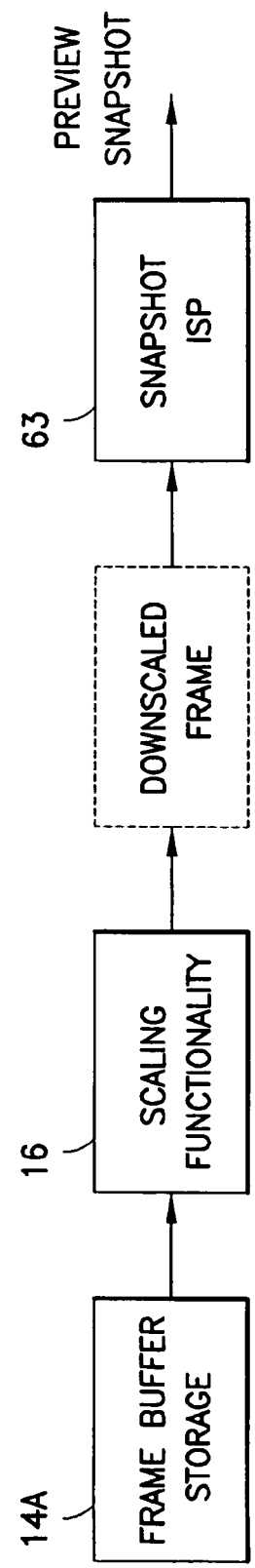

IMAGE PROCESSING ARCHITECTURE WITH PRE-SCALER

TECHNICAL FIELD

The exemplary and min-limiting embodiments of this invention relate generally to image capture systems, methods, devices and computer programs and, more specifically, relate to digital cameras and to techniques to process image data generated by digital cameras.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
AE automatic exposure
AWB automatic white balance
CCD charge coupled device
CMOS complementary metal-oxide-semiconductor
CSI camera serial interface
DPCM differentially pulse coded modulation
FPS frames per second
HDR high dynamic range
HW hardware
ISP image signal processing
LSC lens shading correction
MIPI mobile industry processor interface
MPix million pixels
PCM pulse coded modulation
SW software A demosaicing procedure is used in an imaging pipeline to convert mosaic data into full color image data where complete RGB values are specified at each pixel location. Generally, the steps before the demosaicing step are referred to as being in the RAW domain, and the steps after the demosaicing step are referred to as being in the RGB domain. Processing done in RAW domain can be understood as a pre-processing step(s). Demosaicing is a process of translating a pixel array (e.g., a 2×2 Bayer array) of primary colors into a final image which contains full color information at each pixel.

Image processing architectures have typically experienced size versus performance and quality compromises. As a general rule, simultaneously achieving high image quality and high performance has not been achievable or feasible in a single implementation. While this problem is present for traditional use cases, such as still image capture and video image capture, it will become even more of a problem as new use cases evolve.

SUMMARY

The foregoing and other problems are overcome, and other advantages are realized, in accordance with the exemplary embodiments of this invention.

In accordance with an aspect of the exemplary embodiments of this invention there is provided a method that includes receiving a stream of image data having a first resolution; scaling the received stream of image data using a substantially freely configurable downscaling ratio to generate scaled image data having a second resolution that is less than the first resolution; outputting the scaled image data to at least one of a viewfinder image signal processing functionality or a video image signal processing functionality to create image data for at least one of display to a user or for a video encoder; and during at least one of receiving, scaling or outputting, simultaneously storing the stream or a subset of the stream of image data having the first resolution into a memory as a set of frames of image data for being processed as needed.

In accordance with another aspect of the exemplary embodiments of this invention there is provided an apparatus that comprises an image data scaler comprising an input configured to receive a stream of image data having a first resolution. The image data scaler supports substantially freely configurable downscaling ratios and is configured to scale the received stream of image data to generate scaled image data having a second resolution that is less than the first resolution. The apparatus further comprises an output configured to output the scaled image data to at least one of a viewfinder image signal processing functionality or video image signal processing functionality to create image data for at least one of display to a user or provide as an input to a video encoder. The apparatus also comprises a memory configured to store, simultaneously with the operation of the image data scaler, the stream of image data or a subset of the stream of image data having the first resolution as a set of frames of image data for being processed as needed.

In accordance with another aspect of the exemplary embodiments of this invention there is provided an apparatus that comprises a camera module that comprises an array of light sensors that generate a stream of image data having a first resolution. The apparatus also comprises an image data scaler configurable to use a downscaling ratio that is substantially freely configurable. The image data scaler comprises an input configured to receive the stream of image data having the first resolution and is configured to scale the received stream of image data to generate scaled image data having a second resolution that is less than the first resolution. The image data scaler also includes an output. The apparatus further comprises at least one of a viewfinder image signal processing functionality or a video image signal processing functionality having an input connected with the output of the image data scaler and configured to process the scaled image data having the second resolution. The apparatus further comprises a memory configured to store, simultaneously with operation of the image data scaler, the stream or a subset of the stream of image data having the first resolution as a set of frames of image data. The apparatus also includes a still image signal processing functionality having an input connected with the memory and configured to create still image data based on the stored image data having the first resolution.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIG. 6C shows an exemplary preview snapshot processing chain.

DETAILED DESCRIPTION

Related to the problems discussed above, and as a practical example thereof, it is currently not feasible or optimal to implement, e.g., a 12 MPix, 30 FPS high image quality ISP functionality, although it is currently feasible to implement high image quality ISP functionality capable of processing, for example, 3-5 MPix at 30 FPS. Other aspects of non-feasibility or non-optimality are related to power consumption, processing power requirements and silicon size.

It is noted that the exemplary embodiments of this invention are not limited for use with a Bayer array, but in general can operate with any pixel array arrangement (e.g. binned formats, co-sited formats, different color filter arrangements, e.g. having bright pixels or other different 2D or 3D structures). The Bayer array is currently a most widely used pixel array arrangement.

Various imaging architectures exist. For example, in one known type of imaging architecture the same ISP functionality is used for both still image and video image processing. However, a problem that arises relates to providing high quality and high performance simultaneously for these varied use cases. In another imaging architecture different ISP functionalities are used for still image processing and for video image processing. However, current dual ISP functionality architectures do not support a high data rate input for video processing, as these systems do not have an optimal placement of image data scaler functionality.

The use of exemplary embodiments of this invention, as illustrated in FIGS. 1-7, enable a reduction in an amount of data in an imaging application by placing image data scaling functionality 16, also referred to herein for convenience as a scaler, at an early part of an image signal processing chain 10. The scaling functionality 16 is assumed to be such that the scaling ratio is freely configurable to be one of a plurality of scaling ratios.

Figure 1:
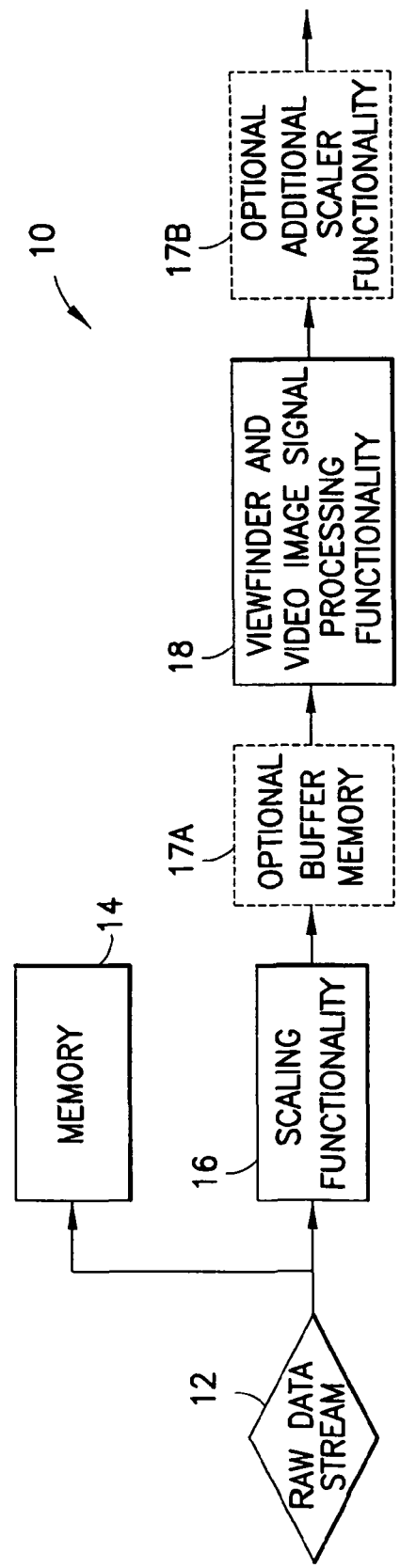
FIG. 1 is a simplified block diagram of an embodiment of an image signal processing chain, also referred to herein as an image processing functionality, that is constructed and operated in accordance with the exemplary embodiments of this invention.

For example, FIG. 1 shows a first exemplary embodiment of the image signal processing chain 10, also referred to herein as an image processing functionality 10, where a raw image data stream 12 is downscaled to some arbitrary reduced resolution by a scaling functionality 16 located before a viewfinder and/or video image signal processing functionality 18 (also referred to herein for simplicity as a VF/V ISP functionality 18). In this embodiment some or all of the raw image data stream 12 is stored in memory 14. The memory 14 can include one or more frame buffers as described in further detail below.

FIG. 1 also shows an optional buffer memory 17A at the output of the scaling functionality 16, and an optional additional scaling functionality 17B at the output of the VF/V ISP functionality 18. The optional buffer memory 17A makes it possible to decouple possible timing dependencies between the scaling functionality and other image signal processing functionality. In addition, this adds delay to the data stream which makes it possible to use current frame statistics information directly in the viewfinder and/or video signal processing functionality 18. Adding the additional scaling functionality 17B may facilitate, e.g., in scaling functionality algorithm implementation and may be useful, e.g., when outputting several different sized image streams from the viewfinder and/or video signal processing functionality 18 or when there is need to carry out up-scaling for digital zoom purposes. These optional components 17A, 17B can be present in any of the other various embodiments described below.

As employed herein a "raw image data stream" or "image data stream" is a flow of digital data output from an image capture device, e.g., from an image capture device having a CCD or a CMOS two dimensional array of light responsive detectors. The raw image data stream represents the amount of light received during an exposure time by the various ones of the light responsive detectors. The raw image data stream can be one that has not been pre-processed by an image signal processor. Alternatively, the raw image data stream may have had one or more operations applied to it, such as defect correction, prior to being received at the input to the scaling functionality 16. The raw image data stream can represent a set of pixels captured by the image capture device. One practical example may be full resolution image frames.

An exemplary aspect of this invention is that the scaling functionality 16 operates in real time or substantially real time on the image data stream 12 as it is received. The scaling functionality 16 can process the image data stream 12, for example, pixel-by-pixel, or line-by-line, block-by-block, or slice-by-slice, depending on the type of scaling operation(s) being performed. Accordingly, a further exemplary aspect of the invention is to output in real time or substantially real time scaled image data having a resolution that is predetermined to reduce the processing load of the viewfinder and/or video image signal processing functionality 18. This type of operation enables a number of beneficial use cases and applications to be realized and implemented, as will be discussed in detail below. For example, the viewfinder functionality can be continuously operated before, during and after an image capture operation, enabling the user to always have a viewfinder image available to observe. Further, during operation of the scaling functionality 16 full resolution frames of image data can be simultaneously stored into the frame buffer memory 14 for being processed as needed.

It can be noted that in still image capture only viewfinder data needs to be generated, while in video recording both viewfinder data and video data need to be generated. It should be further noted that the generated video data is applied to a video encoding functionality (shown the video encoder 66 in FIG. 6), while the viewfinder data is applied to the display 56A for display to the user.

Figure 2A:
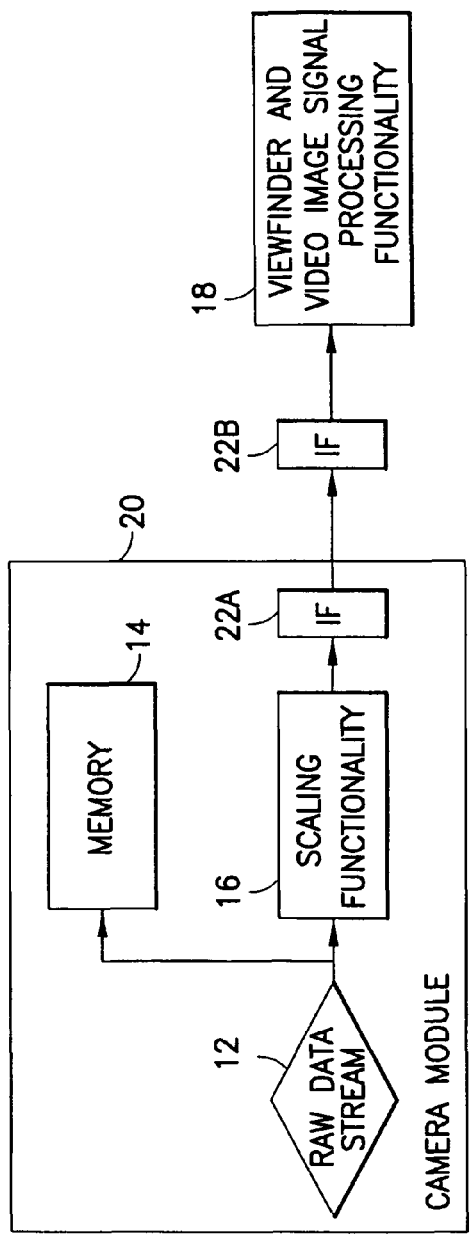
FIGS. 2A, 2B, 2C and 2D, collectively referred to as FIG. 2, are each a simplified block diagram of additional embodiments of an image signal processing chain that is constructed and operated in accordance with the exemplary embodiments of this invention.

FIG. 2A shows a further embodiment of the image signal processing chain 10 where a camera module 20 includes the memory 14 and the scaling functionality 16. In this case the camera module 20, which may be implemented as a single integrated circuit with the image capture device (e.g., a CMOS that generates the raw data stream 12), includes a suitable interface (IF) 22A that communicates with a suitable off-camera module interface 22B (the interfaces 22A, 22B can be collectively referred to as the camera interface 22). In this Figure, as well as, e.g., FIGS. 2B, 2C and 2D, any components shown outside the camera module 20 can be considered as forming the "rest of the system". The "rest of the system" is denoted by the number 60 in FIGS. 3 and 4, described below. This embodiment is similar in some respects to the embodiment of FIG. 1. The image data stored to memory 14 can be used later depending on the use case, e.g., processed inside the camera or, e.g., transferred to other system component(s) using the same or separate interface for being processed as needed.

Figure 2B:
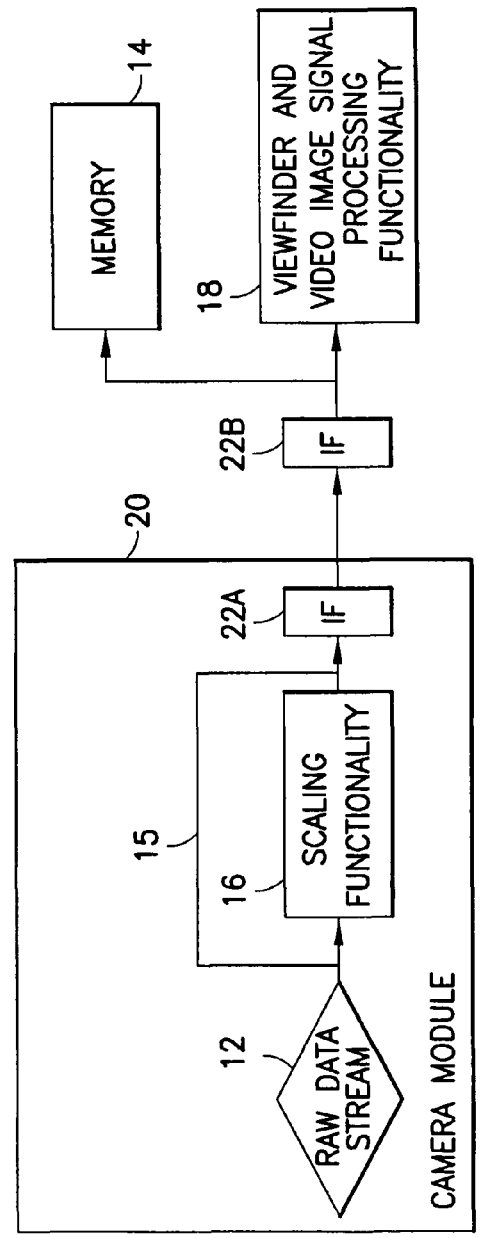

FIG. 2B shows another exemplary embodiment of the image signal processing chain 10 where the camera module 20 includes just the scaling functionality 16. The camera module 20 in this case can selectively transfer scaled and/or unscaled (raw) image data via the interfaces 22A, 22B to the memory 14 and the viewfinder and/or video image signal processing functionality 18. That is, there is bypass path 15 that exists around the scaling functionality 16, and the bypass path can selectively be used or not used at any given time. Note also that the bypass path 15 can be active, and the IF 22A can be time multiplexed to selectively output either the raw data stream from the bypass path 15 and/or the scaled image data stream from the scaling functionality 16. For example, interface 22 may contain a small buffer to enable time multiplexing.

In the embodiment of FIG. 2B both images can be transferred from the camera module 20 in a time multiplex manner, e.g., by using CSI-2 or CSI-3 virtual channels. CSI-3 provides functionality where both streams can be transferred concurrently. In CSI-2, similarly different streams can be multiplexed by, e.g., using virtual channels but in that case the control of how the streams divide the CSI-2 link capacity is more implementation specific (e.g., send a set of non-scaled image lines, then send scaled image line). Reference with regard to CSI-2 and CSI-3 can be made to MIPI standards (www.mipi.org).

Note that in reference to FIG. 2B it is within the scope of the exemplary embodiments of this invention to provide a separate, dedicated output port/interface for providing the unscaled raw image data to the memory 14.

Figure 2C:
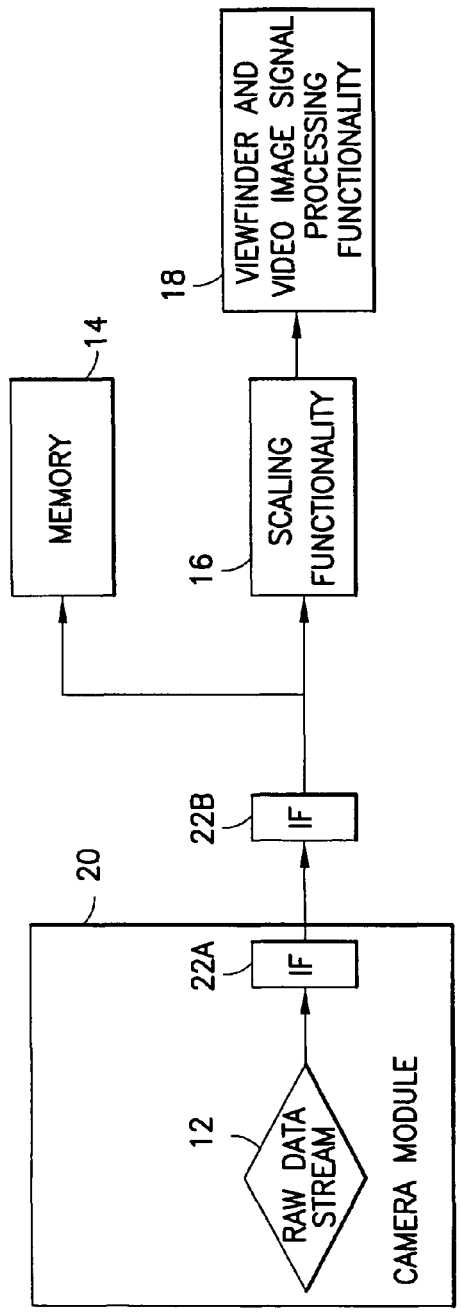

FIG. 2C shows a further exemplary embodiment of the image signal processing chain 10, similar to the embodiment of FIG. 1, where the camera module 20 includes just the source of the raw image data stream 12 and the interface 22A, and the memory 14, scaling functionality 16 and viewfinder and/or video image signal processing functionality 18 are external to the camera module 20.

Figure 2D:
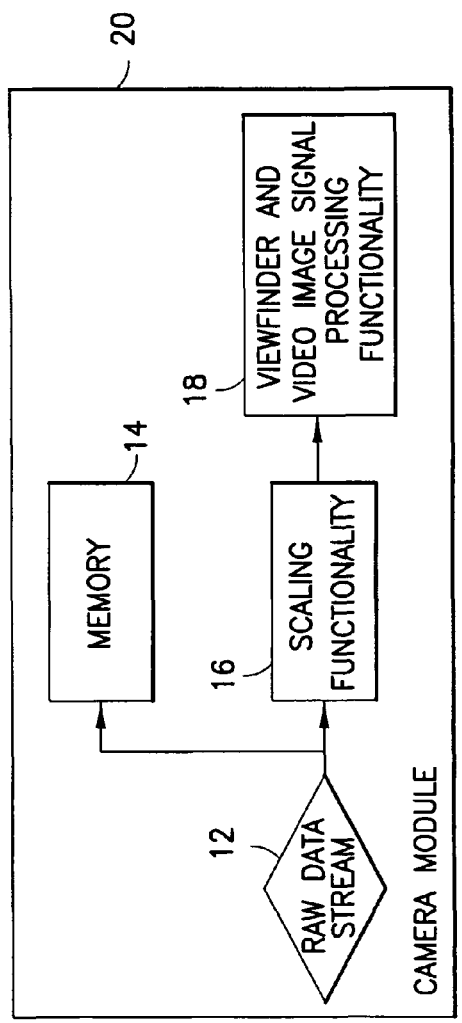

FIG. 2D shows another exemplary embodiment of the image signal processing chain 10, again similar to the embodiment of FIG. 1, where the camera module 20 includes the source of the raw image data stream 12, the memory 14, the scaling functionality 16 and the viewfinder and/or video image signal processing functionality 18. Note in this embodiment that the scaling functionality 16 provides scaled image data to the viewfinder and/or video image signal processing functionality 18 that is internal to the camera module 20, and receives and operates on the raw image data stream 12.

As can be appreciated, in some of the foregoing embodiments the raw data stream 12 can be downscaled by the scaling functionality 16, before the viewfinder/video processing functionality 18, into an intermediate resolution, followed by final downscaling after the viewfinder/video processing functionality 18 using the additional scaler functionality 17B.

In addition, the viewfinder/video image signal processing functionality 18 in certain of the above described embodiments may be performed at least partially by view finder/video algorithms or settings. Further, some or all data from the memory 14 can be processed at least partially by still image algorithms or settings. Further still, some of the image processing functionality, e.g. defect pixel correction, may be located before the scaling functionality 16 and, e.g., lens shading correction before AWB and AE statistics collection for optimizing certain results and to improve image quality.

There are also various implementation options that can be considered, such as providing different partitioning of the functionalities over multiple devices. For example, the placement of the memory 14, the scaling functionality 16 and the viewfinder and/or image signal processing functionality 18 can vary with respect to the camera interface 22, such as in the manner depicted in FIG. 2.

The use of the exemplary embodiments of this invention enables the implementation of various useful features in an imaging processing system of a device, such as a digital camera per se, or some device that incorporates a digital camera, such as a mobile phone. The useful features can include, but are not limited to, one or more of near zero shutter lag image capture, an ability to capture a time series, i.e., a "time-nudge", of images (before and after an image capture moment indicated by the user), still image capture during video recording, continuous viewfinder and/or video during still capture, RAW capture, continuous viewfinder and/or video during very high resolution video capture, and also multi-frame use cases, for example HDR (exposure bracketing), image stabilization (exposure bracketing or same exposure), super resolution, full focus (focus bracketing), temporal noise reduction, and flash-on/flash-off. It is important to note that the use of the exemplary embodiments of this invention makes it possible to have continuous (non-disrupted) viewfinder operation during the abovementioned use cases.

Figure 5:
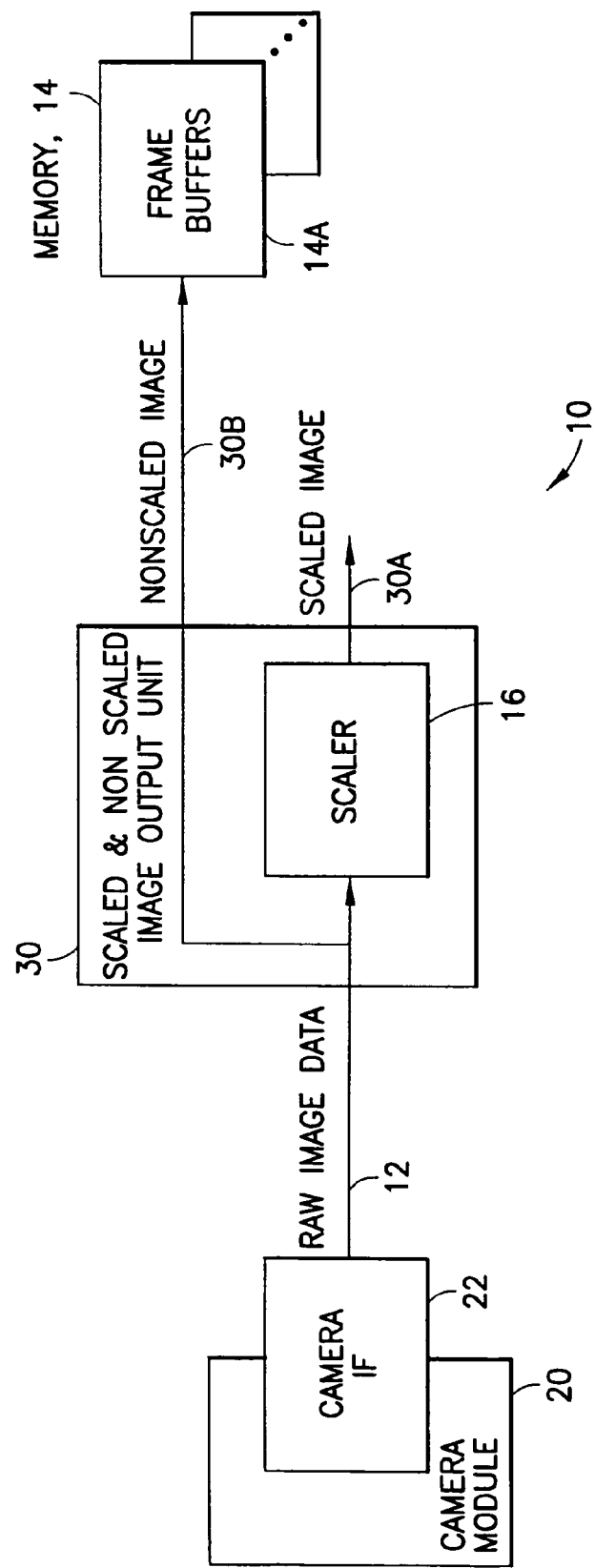
FIG. 5 is a block diagram showing a different view of the scaler and frame buffers shown in FIGS. 1-4.

Referring to FIG. 5, there is provided a scaled-nonscaled image output unit 30 in the image processing system 10. In this embodiment the scaled-nonscaled image output unit 30 is located after the camera interface 22 and receives the raw image data stream 12 from the interface 22. The scaled-nonscaled image output unit 30 includes the scaling functionality 16 that can scale the raw domain input data format to some desired output data format (e.g., as non-limiting examples the scaling functionality 16 can provide a Bayer-to-Bayer scaler, a Bayer-to-co-sited (RGB) scaler, a Binned-to-Bayer scaler, a Binned-to-co-sited (RGB) scaler, a non-Bayer-to-Bayer scaler, a non-Bayer-to-RGB scaler, and a non-Bayer-to-non-Bayer scaler), and further includes circuitry to pass nonscaled image data to frame buffers 14A in the memory 14 for being processed as needed. It may be beneficial that the scaling functionality 16 support at least one of the a) input and b) output being configurable to be in a non-Bayer format. It may be beneficial that the scaling functionality 16 supports one or more input and/or output formats.

Note that the embodiment of FIG. 5 is similar in some respects to the embodiment shown in FIG. 1. Both the scaled (downscaled) image data and the nonscaled image data are available for further processing. A practical implementation of the scaler may be based on, but not limited to, e.g. a bilinear scaler, a bicubic scaler, an area average scaler, and a two phase scaler. The scaling may be carried in such a way that RGB is constructed within the scaling functionality 16, in other words scaling output may be RGB. For instance, Bayer image data can be downscaled into co-sited RGB image data. The benefit of this is that color demosaic can be avoided in the viewfinder and/or video ISP functionality. For instance, non-Bayer image data can be downscaled into co-sited RGB image data. The benefit of this is that color demosaic can be avoided in the viewfinder and/or video ISP functionality. An additional benefit of this approach is that from non-Bayer image data RGB data can be generated directly in a downscaling process without loosing information in possible format conversations (for example, during a non-Bayer-to-Bayer conversion).

Reference with regard to various image scalers and image scaling functionalities, and generally to image processing, can be made to various commonly-owned US Published Patent Applications including: US 2006/0146144, "Digital Imaging with Autofocus", Eero Salmelin, Jaime Haavisto and Ossi Kalevo; US 2006/0290792, "Digital Camera Devices and Methods for Implementing Digital Zoom in Digital Camera Devices and Corresponding Program Products", Jarno Nikkanen and Ossi Kalevo; US 2006/0290796, "Digital Image Processing", Jarno Nikkanen and Ossi Kalevo; US 2007/0230827, "Method and Apparatus for Downscaling a Digital Colour Matrix Image", Mikko Haukijarvi and Ossi Kalevo; US 2008/0018660, "Method and System for Viewing and Enhancing Images", Petri Nenonen, Jaana Parkkinen and Ossi Kalevo; and US 2009/0016644, "Method and Apparatus for Downscaling a Digital Matrix Image", Ossi Kalevo and Hannu Kakkori. Reference can also be made to commonly owned WO 2008/075136, "Exposure Control Based on Image Sensor Cost Function", Ossi Kalevo. Reference can also be made to WO 2008/075136 A1, "Exposure Control Based on Image Sensor Cost Function", Ossi Kalevo. In the embodiment of FIG. 5 full sized raw image frames (the raw image data 12) are transferred from the camera module 20 at a frame rate that is suitable for viewfinding or video use purposes, depending on the application. After the camera interface 22 the raw image data stream 12 is sent to the scaling functionality 16 that down-scales the image data stream, in real-time, to a lower resolution image data stream (i.e., to a scaled image 30A). Simultaneously the raw image data stream or a subset of the raw image data stream can be passed to the memory 14 without scaling (i.e., a nonscaled image 30B).

The scaled image 30A is then further processed for, as a non-limiting example, viewfinding purposes, and the non-scaled image 30B can be stored in memory 14 so that it can be available for image processing and encoding if, for example, a user decides to capture that particular frame. It is also possible that image processing and encoding can happen automatically depending on use case.

It can be assumed that the camera interface 22 is sufficiently fast so that the full raw image frames can be transferred from the camera module 20 to the image processing functionality 10 at a frame rate that is suitable for viewfinding and/or video recording purposes. It can be further assumed that the memory 14 is large enough, and has a sufficient number of frame buffers 14A, so that a number of full raw frames coming from the camera module 20 can be stored. It may also be assumed that the scaling functionality 16 is implemented so that the full raw frames (the raw image data stream 12) can be downscaled in real time.

Figure 3:
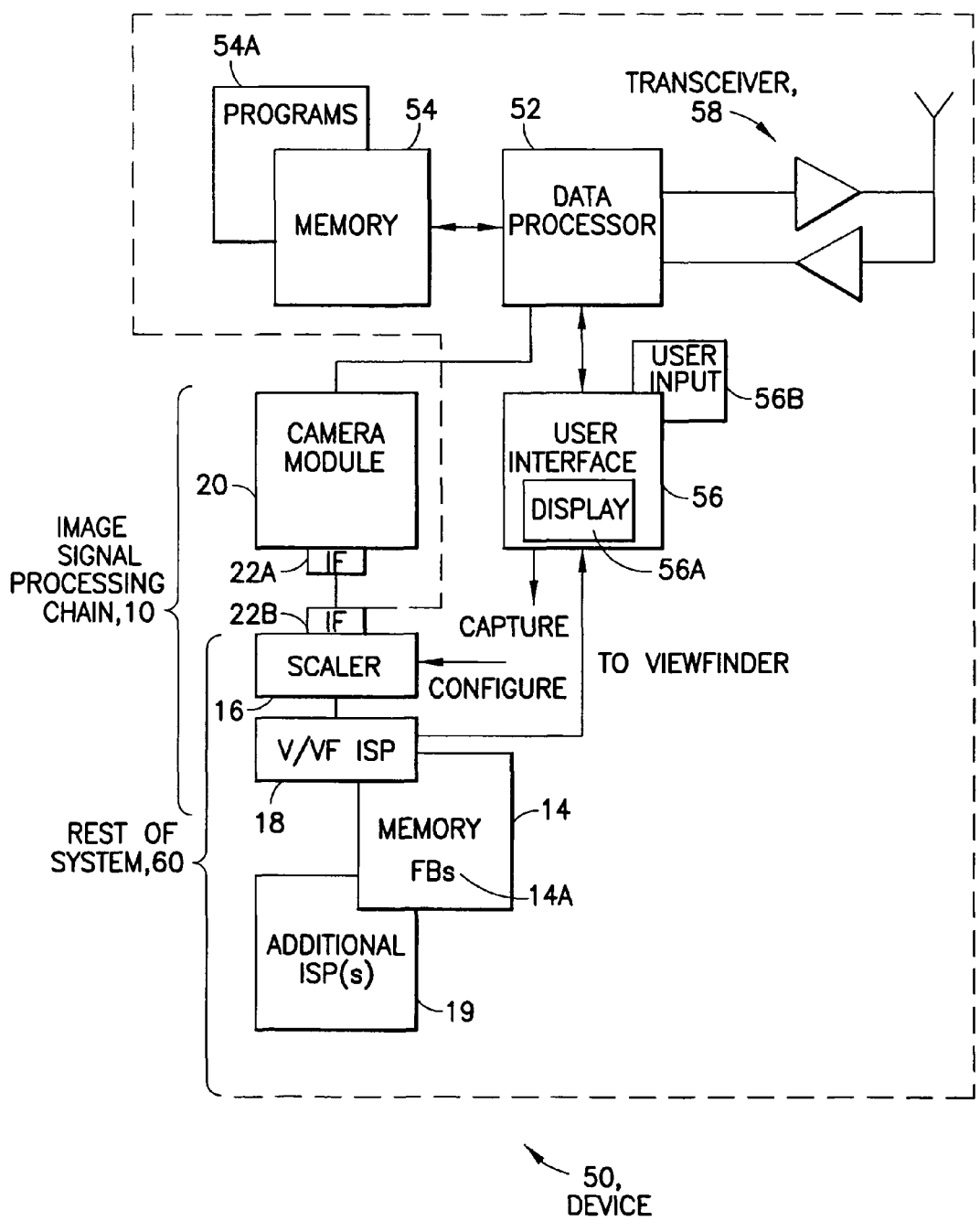
FIG. 3 is a block diagram of an electronic device having a camera module, where the electronic device is constructed and operated in accordance with the exemplary embodiments of this invention.

FIG. 3 illustrates a simplified block diagram of an electronic device and apparatus 50 that is suitable for use in practicing the exemplary embodiments of this invention. In FIG. 3 the device 50 may be a mobile communication device that includes a controller, such as a computer or a data processor (DP) 52, a computer-readable memory medium embodied as a memory 54 that stores programs 54A of computer instructions (SW) suitable to operate the device 50 for its intended purpose(s), a user interface 56, such as one that includes a display 56A, which may be touch sensitive. The user interface 56 can also include a user input 56B functionality that can comprise one or more of a microphone enabling voice control, a keypad, a keyboard, a gesture detector and controller using, for example, visual detection or touch, as non-limiting examples. The memory 54 and/or memory 14 can be embodied in whole or in part by a memory card which may be removable. The device 50 can also include a suitable radio frequency (RF) transceiver 58 for bidirectional wireless communications with external devices and/or communication networks. For the purposes of describing the exemplary embodiments of this invention the device 50 includes the image signal processing chain 10 comprised of the camera module 20, the scaling functionality 16, the viewfinder and/or video image signal processing (VF/V ISP) functionality 18, and the memory 14 including the frame buffers (FBs) 14A. An output of the viewfinder and/or video image signal processing functionality 18 is directed to the user interface 56 for displaying to the user the view finder/video image(s). An output of the user interface 56 is provided (possibly via the data processor 52) as the above-mentioned user-generated image capture input signal to the image signal processing chain 10. The image signal processing chain 10 can include other functionality, such as one or more additional ISP functionalities 19 used for processing image data in the frame buffers 14A, a defect correction function, as well as the above-mentioned additional (post) scaler 17B that can follow the viewfinder and/or video image signal processing functionality 18. Note also that the camera module 20 can be constructed to include one or more of the memory 14, the scaling functionality 16 and possibly also the viewfinder and/or video image signal processing functionality 18, as was shown in FIGS. 2A, 2B and 2D. It should be further noted that the data processor 52 can include all or some of the functionality of the scaler 16 and/or the viewfinder and/or video image signal processing (VFN ISP) functionality 18.

It is pointed out that the presence of the RF transceiver 58 is optional, such as when the device 50 is embodied simply as a digital camera, or as a computer (e.g., a laptop computer or tablet computer), or as a gaming device, as several non-limiting examples. In other embodiments the transceiver 58 could be an optical transceiver, and in other embodiments it could be configured for connection to a wired network via a cable or some other non-wireless communication medium.

In some embodiments certain of the components, such as the scaling functionality 16 and VFN ISP functionality 18, and possibly also the memory 14 and additional ISP functionality(s) 19 (if present) can be embodied in an integrated circuit or circuits that can be referred to as a chipset, and that are referred to herein simply as the rest or remainder of the system 60. Note that in practice the "rest of the system 60", shown as those components contained within the dashed line in FIG. 3, can include anything in the device or apparatus that is not contained with the camera module 20.

It can be noted that while the memories 14 and 54 are shown as being separate, in some embodiments they may actually be a single memory.

Note that what follows is descriptive of implementations showing ISPs and not the underlying ISP functionalities. The ISP functionalities can, in general, be implemented with one or more instances of processing solutions, which can include for example one or multiple processors and/or specific HW instances, which may be located in one or more physical chips.

It is pointed out that an aspect of the exemplary embodiments is that the scaling functionality 16 can scale the received stream of image data using a substantially freely configurable downscaling ratio to generate scaled image data having the second resolution that is less than the first resolution. The downscaling ratio can be substantially freely configured in one or both of the horizontal and vertical dimensions in such a way that that the first resolution and the second resolution, which is less than the first resolution, can be arbitrary or substantially arbitrary within certain predefined limits (e.g., in steps of 8 pixels in certain predefined ranges). FIG. 3 shows the scaling functionality 16 as having a configure input whereby the scaling ratio can be programmed/controlled and subsequently reprogrammed if desired. That is, the downscaling ratio is not limited for use only with some predetermined set of scaling ratios (e.g., 2×2, 3×3, 4×4), but can be substantially freely configured (and reconfigured) during operation such that the second resolution output from the scaling functionality 16 can be substantially arbitrary in one or both of the horizontal and vertical image dimensions (in steps of from one pixel to some larger number of pixels). The configure input may be sourced from, for example, the data processor 52 or from one (or more) of the ISPs 18, 19.

Techniques to provide an image scaler functionality that uses a substantially freely configurable downscaling ratio are known. For example, reference can be made to one or both of the above-referenced US 2007/0230827 and US 2009/0016644. Further, reference can be made to a document entitled: SMIA 1.0 Part 1: Functional specification (2004), such as in general Section 9, Image Scaling, and more specifically sub-section 9.4, Down Scaler Factor.

FIGS. 4A, 4B, 4C and 4D illustrate various partitions of the components between the camera module 20 and the rest of the system 60.

Figure 4A:
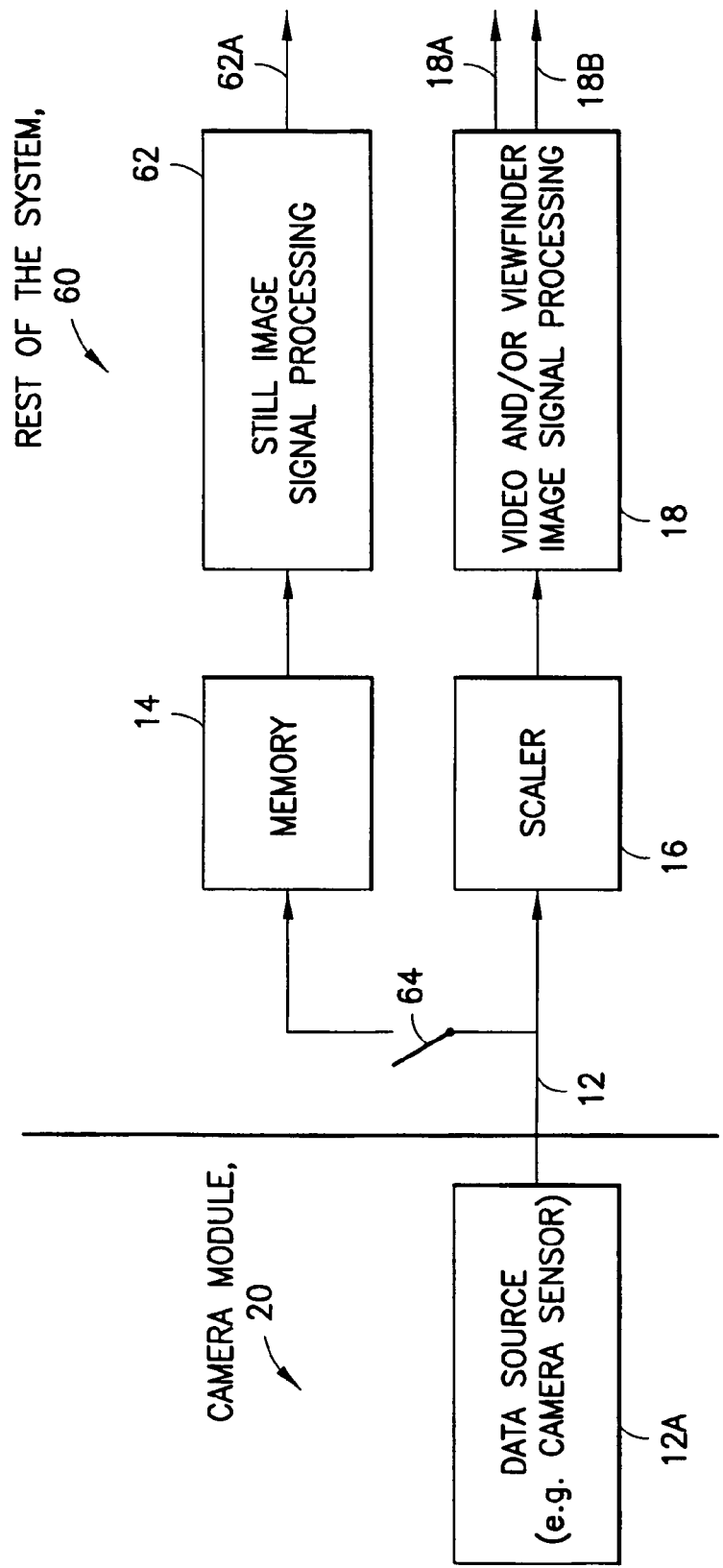
FIGS. 4A-4D, collectively referred to as FIG. 4, present different exemplary embodiments of partitions of the scaler, frame buffer memory and image signal processing functionalities between the camera module and the rest of the system.

In FIG. 4A the camera module 20 includes the data source (e.g., camera sensor 12A) that outputs the image data stream 12 to the scaling functionality 16. Also shown is a switch 64 (a logical and/or physical image data switch) that when closed passes the image data stream 12 to the memory 14. The VF/V ISP functionality 18 receives the output of the scaling functionality 16, while a further ISP functionality, referred to as a still image ISP functionality 62, receives the output of the memory 14 (the output of the frame buffer or buffers 14A). In this exemplary embodiment the memory 14, scaling functionality 16, and the ISP functionalities 18 and 62 are included in the rest of the system 60. Note that this embodiment is similar in some respects to the embodiment shown in FIG. 2C.

Figure 6A:
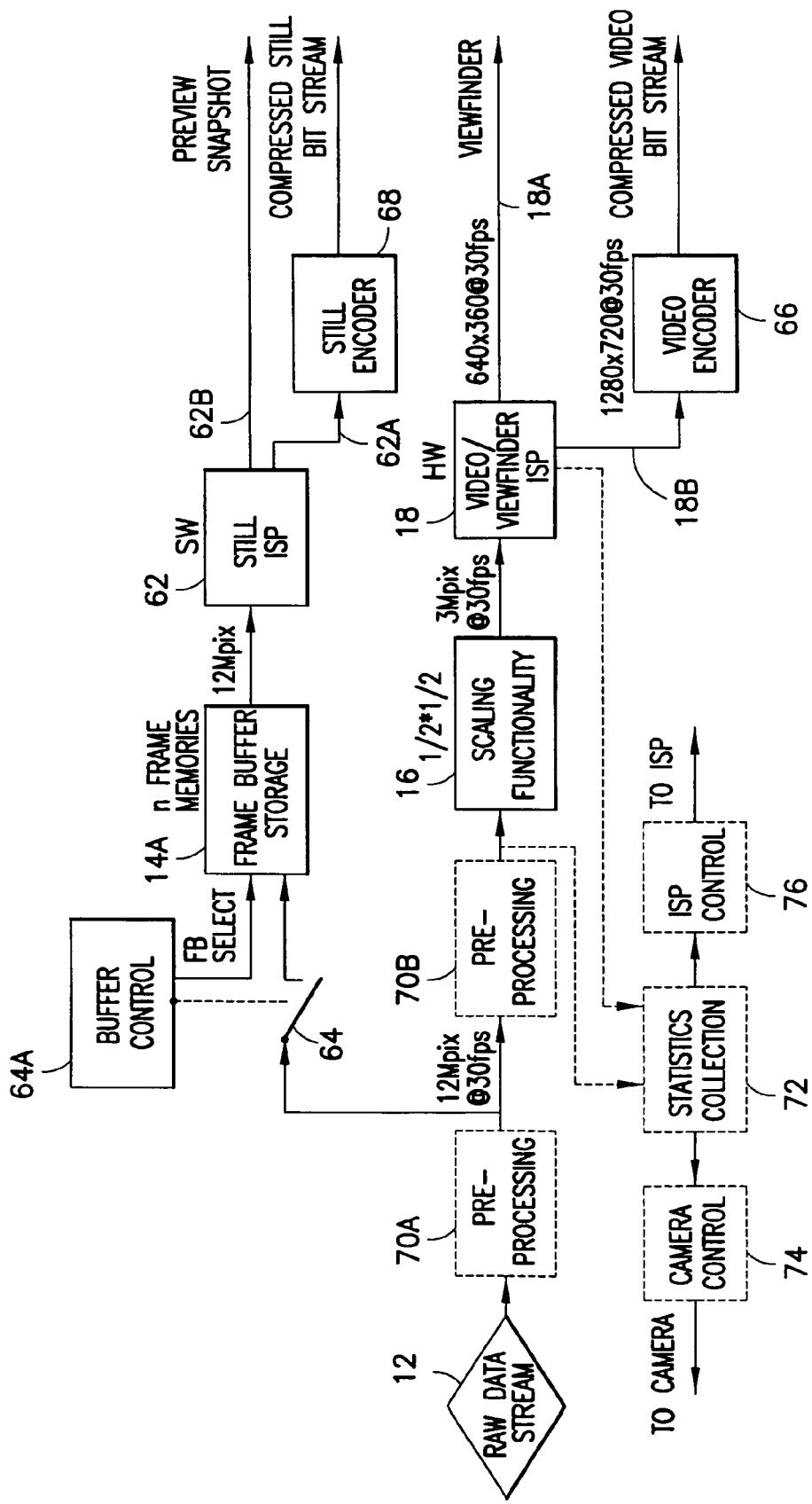
FIGS. 6A and 6B are each a block diagram showing in greater detail the various components illustrated in FIGS. 1 through 5, and show by way of a non-limiting example the use of 2×2 downscaling by the scaling functionality in FIG. 6A.

In this embodiment the VF/V ISP functionality 18 is shown as having two outputs 18A and 18B. For example, and as is shown in greater detail in FIG. 6A, the first output 18A can be sent to the viewfinder (e.g., to the display 56A of the user interface 56) at a first resolution (e.g., 640×360 at 30 FPS), while the second output 18B can be sent to a video encoding functionality 66 at a second resolution (e.g., 1280×720 at 30 FPS). Note that the first and second resolutions referred to here need not coincide with the image resolution coming from the camera itself, and present in the raw data stream 12. The video encoding functionality 66 then outputs a compressed video bit stream. As is also shown in FIG. 6A, the output 62A of the still ISP functionality 62 can be provided to a still image encoding functionality 68. The still image encoding functionality 68 then outputs a compressed still bit stream. The video and still encoding functionalities 66, 68 may use same processing element(s).

Figure 4B:
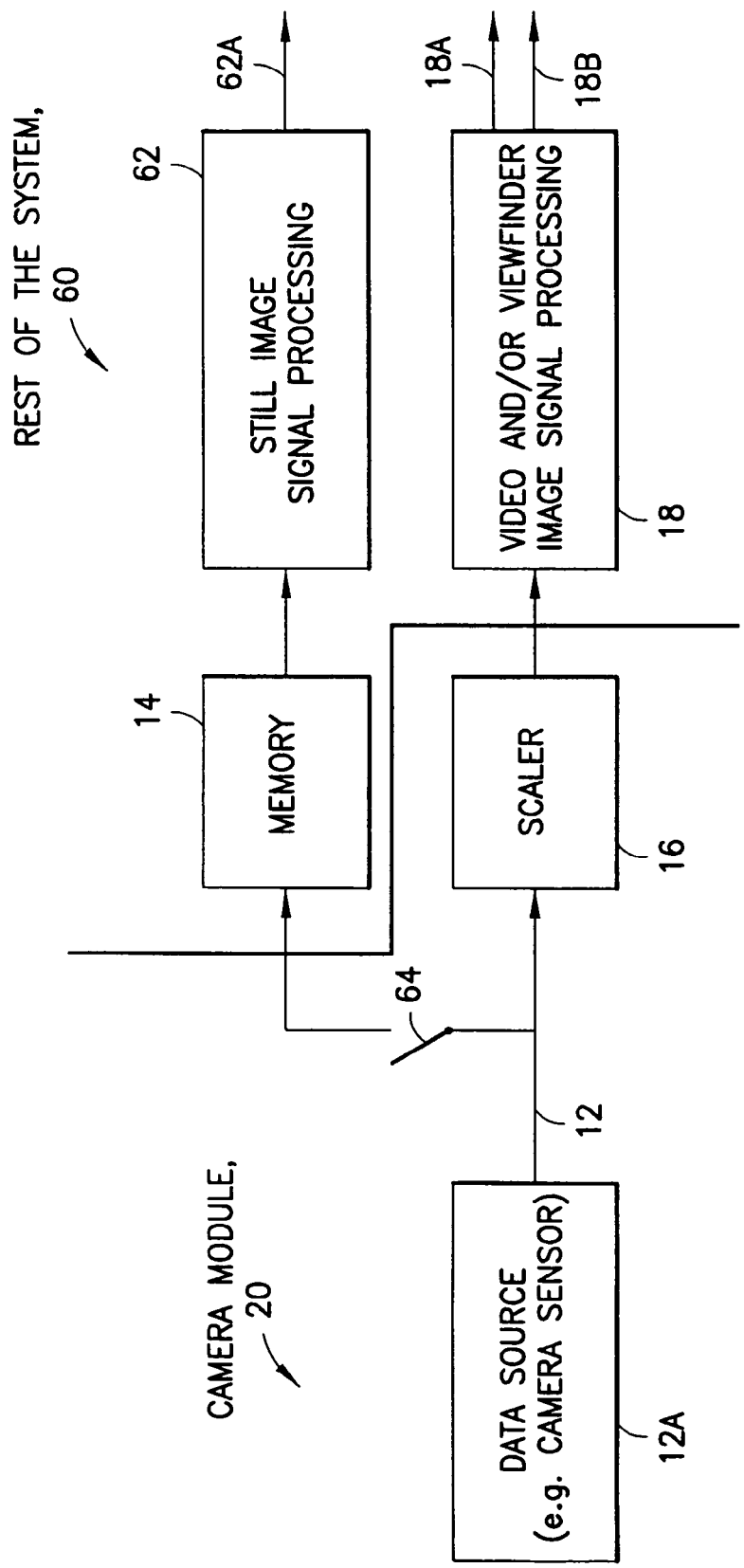

FIG. 4B shows an exemplary partition where the scaling functionality 16 and switch 64 are included in the camera module 20, while the memory 14 and ISP functionalities 18 and 62 are included in the rest of the system 60. Note that this embodiment is similar in some respects to the embodiment shown in FIG. 2B. In this embodiment the camera module 20 can be implemented with two image data outputs, one representing the reduced resolution output from the scaling functionality 16, and the other representing the full resolution output for storage in the frame buffer memory 14.

Figure 4C:
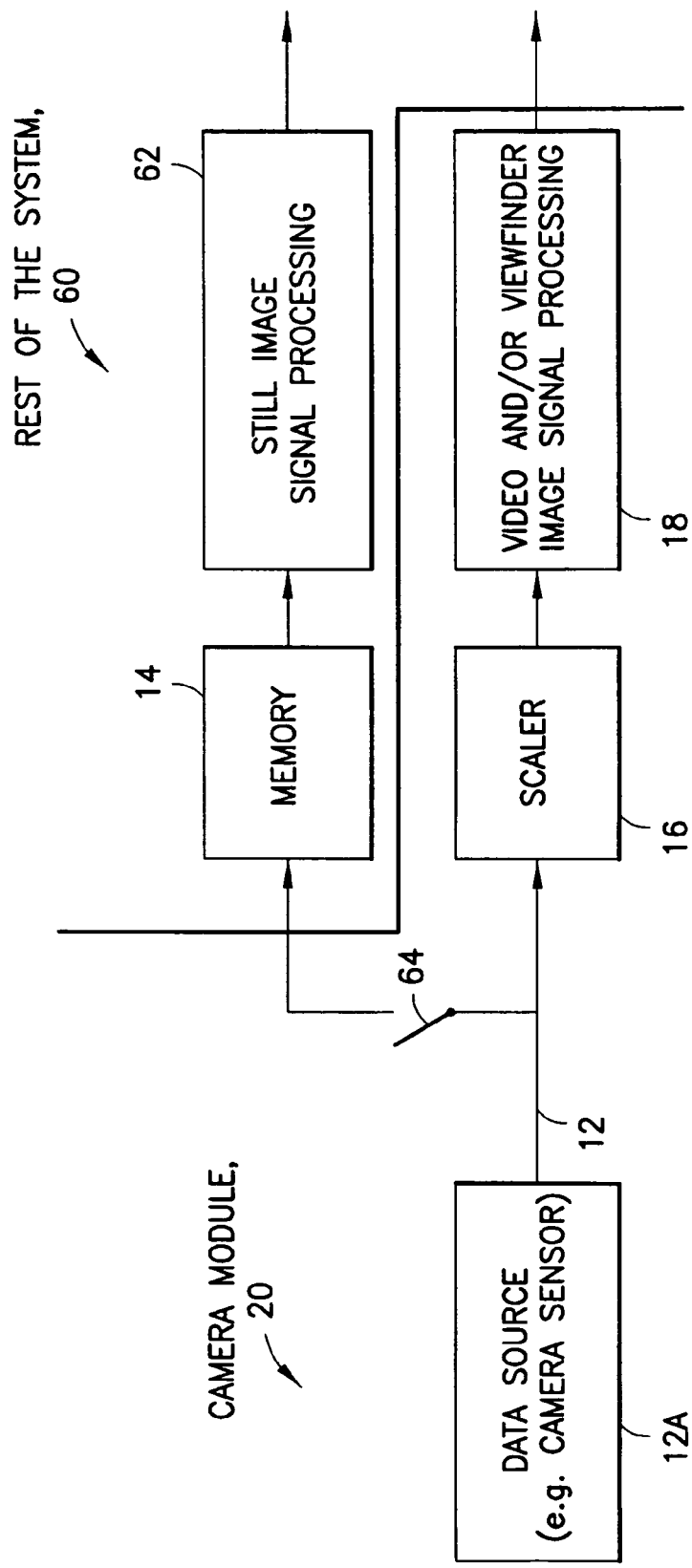

FIG. 4C shows an exemplary partition where the scaling functionality 16, VF/V ISP functionality 18 and switch 64 are included in the camera module 20, while the memory 14 and still ISP functionality 62 are included in the rest of the system 60.

Figure 4D:
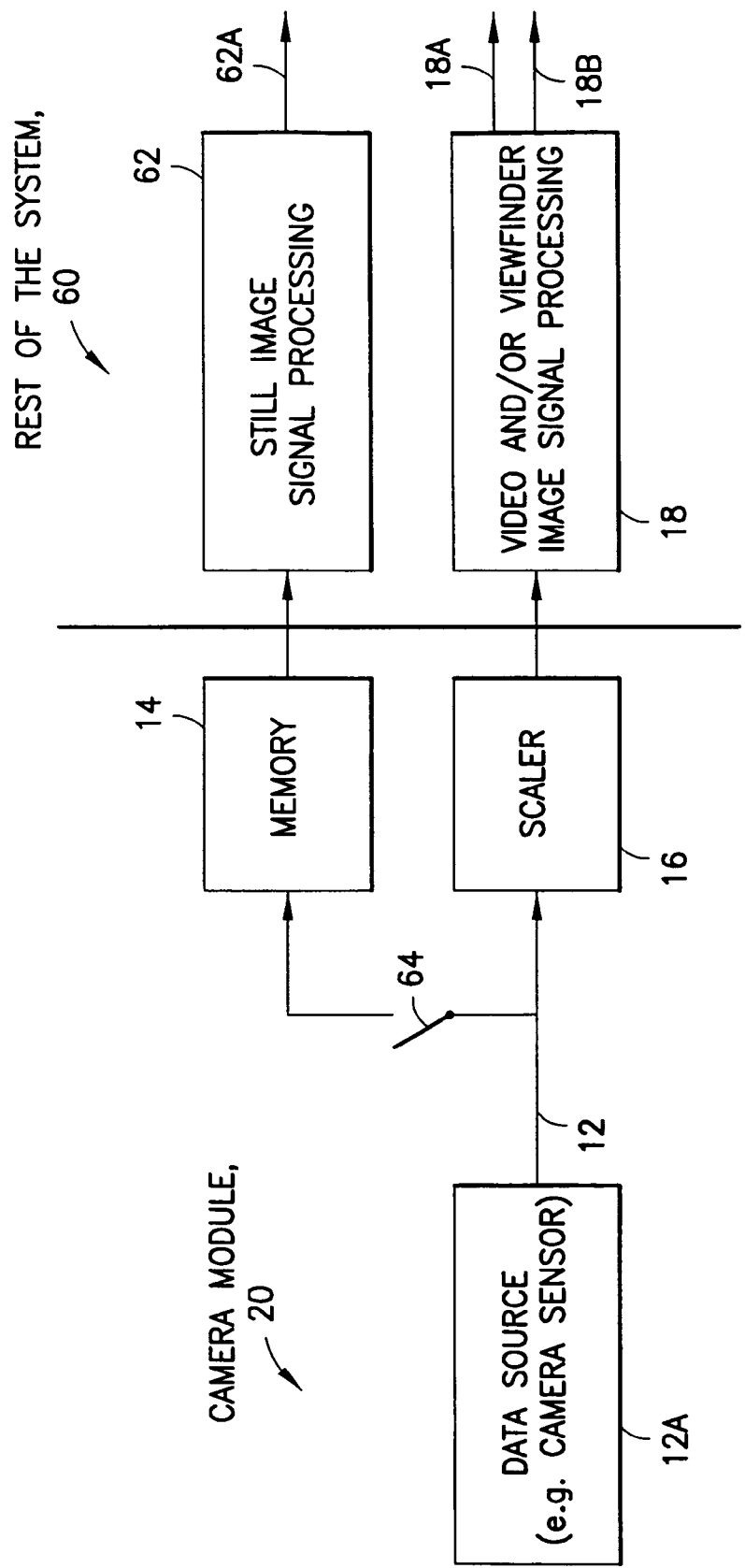

FIG. 4D shows a further exemplary partition where the scaling functionality 16, the memory 14 and the switch 64 are included in the camera module 20, while the ISP functionalities 18 and 62 are included in the rest of the system 60. Note that this embodiment is similar in some respects to the embodiment shown in FIG. 2A.

Outputs from camera module in FIGS. 4B, 4C and 4D may use one or multiple interfaces.

Figure 6B:
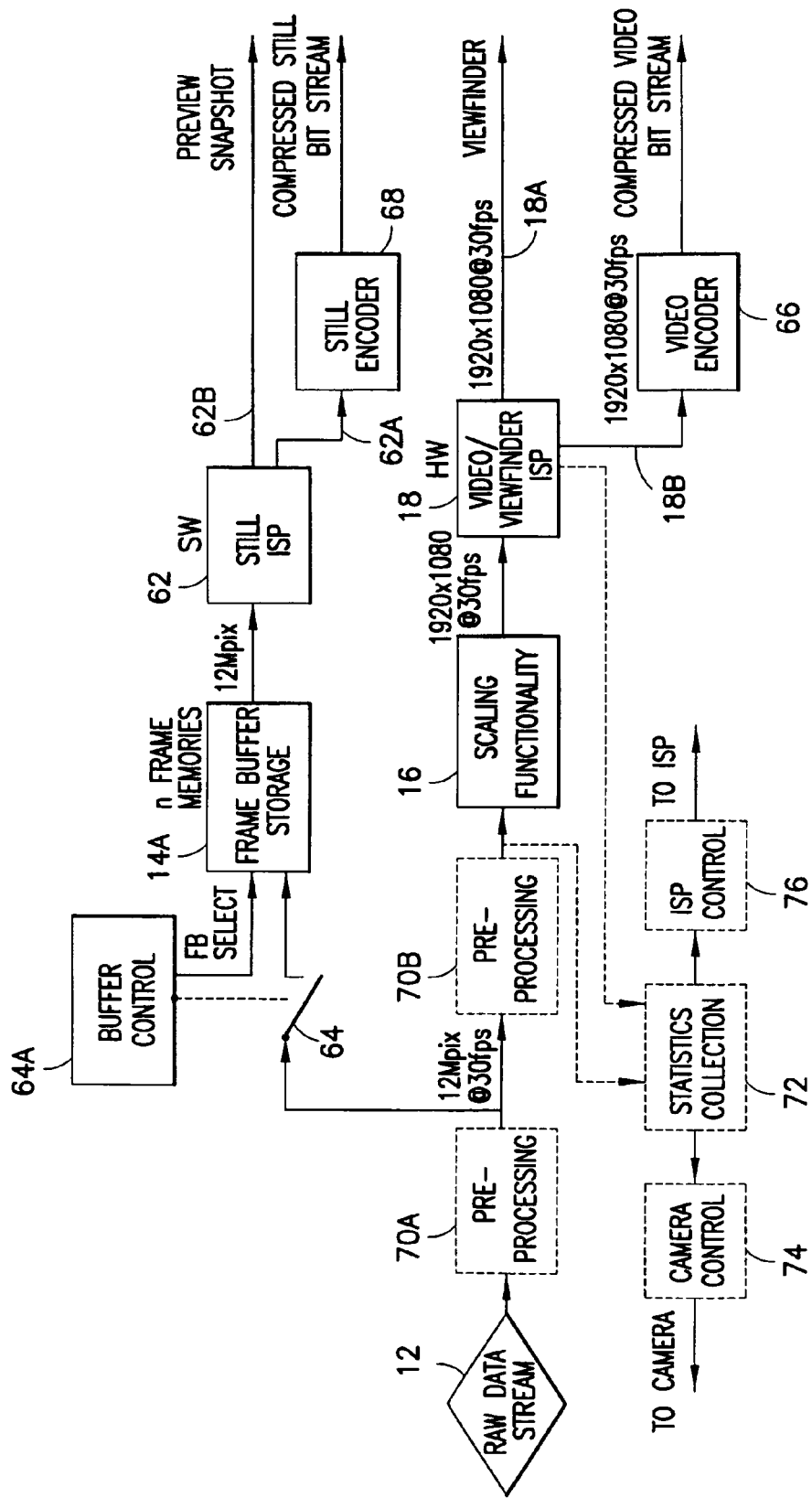

FIG. 6A is a block diagram showing in greater detail the various components illustrated in FIGS. 1 through 5. The various numbers of pixels, frames per second and image resolutions shown in FIG. 6A are merely exemplary, and are not intended to be viewed in any manner as being limiting as to the use, practice and implementation of the various non-limiting embodiments of this invention. Note, for example, that FIG. 6B shows different image resolutions (e.g., 1920×1080) than those shown in FIG. 6A.

In addition to the components discussed thus far the image signal processing chain 10 includes a buffer control 64A that controls the state (open or closed) of the switch 64. An optional image data stream pre-processing block 70A is shown interposed between the source of the raw data stream 12 and the input to the frame buffer storage 14A, and another optional image data stream pre-processing block 70B is shown interposed between the output of the pre-processing block 70A (or the output of the source of the raw data stream 12 if the pre-processing block 70A is not present) and the input to the scaling functionality 16. Also shown is a statistics collection unit 72 that provides an output to a camera control block 74. The output can be used for, as examples, autoexposure and autofocus operations of the camera. The statistics collection unit 72 can receive a first input taken before the scaling functionality 16. An optional second input can be received from the VF/V ISP functionality 18, and a second output can be provided to an ISP control unit 76. The ISP control units 76 can use statistics to which lens shading correction (LSC) has been applied, and the second input to statistics collection unit 72 can represent lens shading correction corrected data. While LSC can be applied as a preprocessing step (e.g., in one of preprocessors 70A, 70B), it is advantageous to perform such image processing operations on reduced resolution image data (i.e., after the scaling functionality 16, e.g. in video/viewfinder ISP 18). It is also possible that statistics collection block 72 includes some preprocessing steps.

As has been described, the scaling functionality (scaling functionality 16) reduces the amount of pixels that need to be processed during viewfinder and/or video image signal processing by the ISP functionality 18. This is achieved by downscaling the image to a lower spatial resolution (However, it should be noted that after the downscaling the number of color components per spatial sample may remain the same (e.g. Bayer-to-Bayer down scaling) or increase (e.g. Bayer-to-RGB down scaling)). If a digital zoom function is applied the scaling functionality 16 may perform a combination of cropping and downscaling, or it may perform image cropping only, or it may perform downscaling only. One important function of the scaling functionality 16 is to reduce the computational requirements of the video/viewfinder image signal processing functionality 18.

The buffer control 64A determines which frames shall be stored in the memory 14, and also determines with a control signal FB_Select a specific frame buffer 14A (among the set of frame buffers) into which a frame is to be stored. The buffer control MA may operate differently in different use cases, as will be made more apparent below.

The optional preprocessing block(s) 70A, 70B carries out any image processing steps that are desired to be performed prior to the scaling functionality 16. As one non-limiting example, if the camera sensor 12A produces defective pixels the preprocessing block(s) 70A, 70B can perform defective pixel correction. As was noted above, it may be beneficial that also lens shading correction is carried out before the scaling functionality 16, e.g., in a case of statistics being collected only once.

As has been described above the viewfinder/video image signal processor 18 carries out the steps needed to process the image data into high quality viewfinder and/or video image streams. The VF/V ISP functionality 18 can also perform further scaling operations, such as downscaling from an intermediate resolution to the target resolution and/or upscaling for digital zoom.

The above-mentioned statistics collection unit 72 collects statistics that are relevant for the camera control 74, accessory control including, e.g., flash and actuators (e.g. autofocus, ND-filter, IRIS, mechanical shutter, OIS) and ISP control 76. Statistics can include statistics needed by, e.g., autoexposure, autofocus functions and ISP control functions (e.g. AWB, noise reduction and gamma).

Note in FIGS. 6A and 6B that there could be video stabilization functionality included in the image processing chain as well. This is not included in the figure for simplicity.

FIG. 6C shows an exemplary preview snapshot processing chain, where a downscaled image frame is applied to a snapshot ISP functionality 63 (which could be incorporated in the still image ISP functionality 62 or video/viewfinder ISP functionality 18).

The various use cases of the image signal processing chain 10, in accordance with the exemplary embodiments, can include, but are not limited to, full resolution still image capture during video recording, e.g., the capture of a full resolution image (e.g. 12 Mpix) during video recording (e.g., 1080 P).

Another exemplary use case is shutter lag minimization, where all or some full resolution frame(s) are stored into the memory 14. It may be beneficial to store images into the memory 14 with smaller frequency than the viewfinder requires to reduce, e.g., power consumption, memory traffic or due to other system limitations. Even in this case, use case requirements may be achieved (e.g. +−100 ms shutter lag roughly means 5 fps capture). The system then processes the stored frame, using the still image ISP functionality 62, that is nearest in time to a user commanded image capture event.

Another exemplary use case is time shifting, where the image signal processing chain 10 continuously captures images at specific intervals (e.g., every 300 ms) into the circular set of frame buffers 14A. When the user commands a capture event, the image signal processing chain 10 captures the frame at that moment, and one or more additional frames after the capture event moment at specific intervals. The sequence of frames that contain frames prior to the capture event, the frame at the capture event, and frames after capture event can then be displayed to the user, enabling the user to select one or more of these captured frames as a frame to be retained as a still image.

Another exemplary use case is still image capture with surrounding video, and the continuous storage of video into a circular buffer. In this use case, and once a still capture event occurs, the image can be captured into the memory 14, and video is continued to be captured for some specified time. This enables, for example, attaching a video sequence containing, ±n seconds of video to the still image.

Discussing now some of these various exemplary and non-limiting use cases and applications in further detail, the near zero shutter lag application enables full frames to be continuously transferred from the camera module 20 to the set of frame buffers 14A. In this application two frame buffers can be used, where one frame buffer stores a frame being output by the camera module 20 and where another frame buffer contains the latest (previous) captured image frame. When the user presses a capture button (or indicates the moment of capture by other means, e.g., with the touch screen 56A), the latest captured frame that is fully available in the frame buffers 14A is processed by the still ISP functionality 62 and encoded by still image encoding functionality 68. It can be noted that raw images may also be stored for future use.

Another use case and application relates to capturing the time series of images. In this application full frames are continuously transferred from the camera module 20 to the set of frame buffers 14A in the memory 14. The set of frame buffers 14A contains N frames (N can be 7, for example) that are operated in a ring buffer fashion by the buffer control 64A. That is, image data is stored in the first frame buffer, then the second, then the third, etc., and after storing image data in the last (the $N^{th}$) frame buffer the first frame buffer is reused (the previously stored image data is overwritten) and the process repeats. When the user presses the capture button several previously stored frames of image data are already available in the frame buffers 14A. After the capture moment at least one, and preferably two or more, additional frames are stored into the frame buffers 14A such that there can be, for example, three images captured prior to capture button is pressed, one near the moment when the capture button is pressed, and three images captured after the capture button is pressed. While the full frames are being continuously stored into the frame buffers 14A the frames are also downscaled in real time by scaling functionality 16 and processed in the VF/V ISP functionality 18 for viewfinding and/or video purposes. Still image processing, encoding and storing steps are performed for those frames that are available in the frame buffers 14A. This can be done for all of the images stored in the frame buffers 14A, or only for the one or more that the user specifically desires to store. In this application the user may determine that a particular still image (or images) of the sequence of images is preferable to the image that was captured in response to the capture event initiated by the user.

Another use case and application relates to the above-mentioned image capture during video recording. In this application full frames are transferred from the camera module 20, downscaled in real time by scaling functionality 16 and processed by the viewfinder and/or video image signal processing functionality 18 for video encoding and viewfinding purposes. If the user desires to capture an image while video recording is in process a full raw image is stored into a frame buffer 14A, and this captured image can then be processed to be a still image as, for example, a background processing task by the still ISP functionality 62 while the video recording task is ongoing.

A further use case and application relates to multi-frame still image stabilization. In this further non-limiting application full frames are continuously transferred from the camera module 20 and stored into the frame buffers 14A that are operated in the ring buffer configuration by buffer control 64A. The full frames are also downscaled in real time by scaling functionality 16 and processed by the viewfinder and/or video image signal processing functionality 18 for view finding purposes. When the user indicates the image capture moment several frames are already available in the frame buffers 14A. At least one additional image can be captured if desired and stored into the frame buffers 14A so that at least, for example, 2-4 consecutive frames are available. These 2-4 consecutive frames can be then combined using any suitable multi-frame stabilization algorithm, and processed and encoded as a single stabilized still image. It should be noted that this method can be used with a number of multi-frame algorithms such as, but not limited to, super-resolution and noise reduction algorithms.

In the exemplary embodiments of this invention various data paths exist to enable the flexible receiving of image data. A first data path exists between the camera interface 22 and the memory 14, which can be used to decouple the interface 22 from image processing. An additional data path can exist between the camera interface 22 and the scaling functionality 16. An additional data path can exist between the memory 14 and the scaling functionality 16.

The scaling functionality 16 can be implemented in HW, SW, or as a combination of HW and SW.

It should be noted that raw data can be in a decompressed format (e.g. DPCM/PCM). The scaling functionality 16 or other parts of the image processing chain can also take image data from a decompression block. For example, a decompressed image data stream can be sent to the scaling functionality 16 directly after decompression.

If the image signal processing chain 10 includes an optional defect pixel correction block (e.g., one implemented by the preprocessor 70) it can be beneficial to perform defect correction before the scaling functionality 16. The scaling functionality 16 can output data to the viewfinder and/or video image signal processing functionality 18. The scaling functionality 16 can be used to generate a downscaled image for a snapshot purposes. The snapshot is processed by the snapshot ISP functionality that might utilize same processing resources that other ISP functionalities. The scaling functionality 16 can be optimized for video/view finder purposes such as by supporting limited maximum output resolutions.

The scaling functionality 16 can be optimized to support suitable scaling quality for video/view finder use cases. The scaling functionality 16 can also be optimized to support limited bit accuracy. In general, the scaling functionality 16 can output, for example, both raw Bayer and co-sited data.

The viewfinder and/or video image signal processing functionality 18 can take data from the memory 14 (or 17A) or it can take data directly from the scaling functionality 16. If the viewfinder and/or video image signal processing functionality 18 is used only for video/viewfinder purposes it can be thus optimized, e.g., it can support co-sited input, it can provide support for only video/viewfinder resolutions, it can use less bit accuracy, and/or it can use processing suitable for video (i.e., optimum sharpness is generally not important). As the viewfinder and/or video image signal processing functionality 18 is typically downscaled, noise filtering is not extremely important, but can be optimized to produce suitable quality for the encoder 66 shown in FIG. 6.

The image processing functionality 10 can include the defect correction block before the scaling functionality 16. The defect correction can use a high performance approach if used with, for example, video or viewfinder use cases.

It is also within the scope of these exemplary embodiments to place the second scaler (the post-scaler 17B) after the viewfinder and/or video image signal processing functionality 18. In this case the first scaling functionality 16 produces a maximum of image data stream size (e.g., maximum video resolution and/or screen resolution), while the second scaler 17B downscales the stream for smaller size (e.g., minimum of video resolution and/or screen resolution).

It can be noted that the scaling can occur such that the scaling is done directly to a target viewfinder resolution. It is also noted that only rough downscaling can occur in the scaling functionality 16, and then further refinement downscaling can occur later. Refinement downscaling could occur, for example, as post-ISP downscaling by the post-scaler 17B.

One non-limiting technical effect and technical advantage that is realized by the use of the exemplary embodiments of this invention is that new and useful features can be implemented in the image processing functionality 10 without the need to feed high resolution frames from the memory 14 to the viewfinder and/or video image signal processing functionality 18. Instead, the image processing of the viewfinder and/or video image signal processing functionality 18 can advantageously use lower resolution image data output from the scaling functionality 16.

Another non-limiting technical effect and technical advantage that is realized by the use of the exemplary embodiments of this invention is that ISP functionality in the viewfinder and/or video image signal processing functionality 18 can have reduced throughput requirements, thereby enabling the possibility to use more optimal algorithms, as well as to achieve a smaller circuit size and/or reduced power consumption Another non-limiting technical effect and technical advantage that is realized by the use of the exemplary embodiments of this invention is that enhanced quality and user experience can be achieved as compared to current approaches.

Another non-limiting technical effect and technical advantage that is realized by the use of the exemplary embodiments of this invention is that the methodology does not suffer due to the different requirements of video and still image processing as in typical image processing architectures.

Further non-limiting technical effects and technical advantages that are realized by the use of the exemplary embodiments of this invention concern the enabling of a number of useful operational modes, including providing fluent viewfinder operation during burst image capture mode, the near zero shutter lag operation, an ability provide still capture during video recording, an ability to provide video recording around still image capture, time shift (time nudge) operation, the provision of a low power consumption viewfinder for augmented reality applications, and higher quality video and higher quality still image capture with reduced cost.

The scaling functionality 16 and the viewfinder and/or video image signal processing functionality 18 can be implemented as discrete HW elements and embodied in one or more integrated circuits or modules (if not embodied in the camera module 20). Alternatively, one or both of the scaling functionality 16 and the viewfinder and/or video image signal processing functionality 18 can be embodied by a data processor executing SW stored in the memory 14, or the memory 54, or stored elsewhere.

Based on the foregoing it should be apparent that the exemplary embodiments of this invention provide a method, apparatus and computer program(s) to provide an enhanced image signal processing chain providing, from raw image data, scaled image data to the viewfinder and/or video image signal processing functionality 18.

It should be appreciated that the exemplary embodiments of this invention enable the utilization of stored image data having full scale resolution, that is stored in parallel with the scaling of the image data to a reduced resolution, for enabling a number of valuable use cases to be realized. These use cases include, but are not limited to, still image capture during video recording, near zero shutter lag operation and burst image capture operation. An ability to also scale the raw image data stream in the chipset is advantageous, as it enables a reduction of memory traffic and overall power consumption for any image processing components operating with reduced resolution image data. The use of the co-sited image data format is also advantageous, as it enables the elimination of a subsequent demosaic block while providing enhanced image quality. It is also possible to provide viewfinder and video formats having different resolutions and/or frame rates. One non-limiting aspect of the use of the exemplary embodiments of this invention is an ability to provide enhanced still image capture modes of operation in conjunction with viewfinder and/or video image operation.

Figure 7:
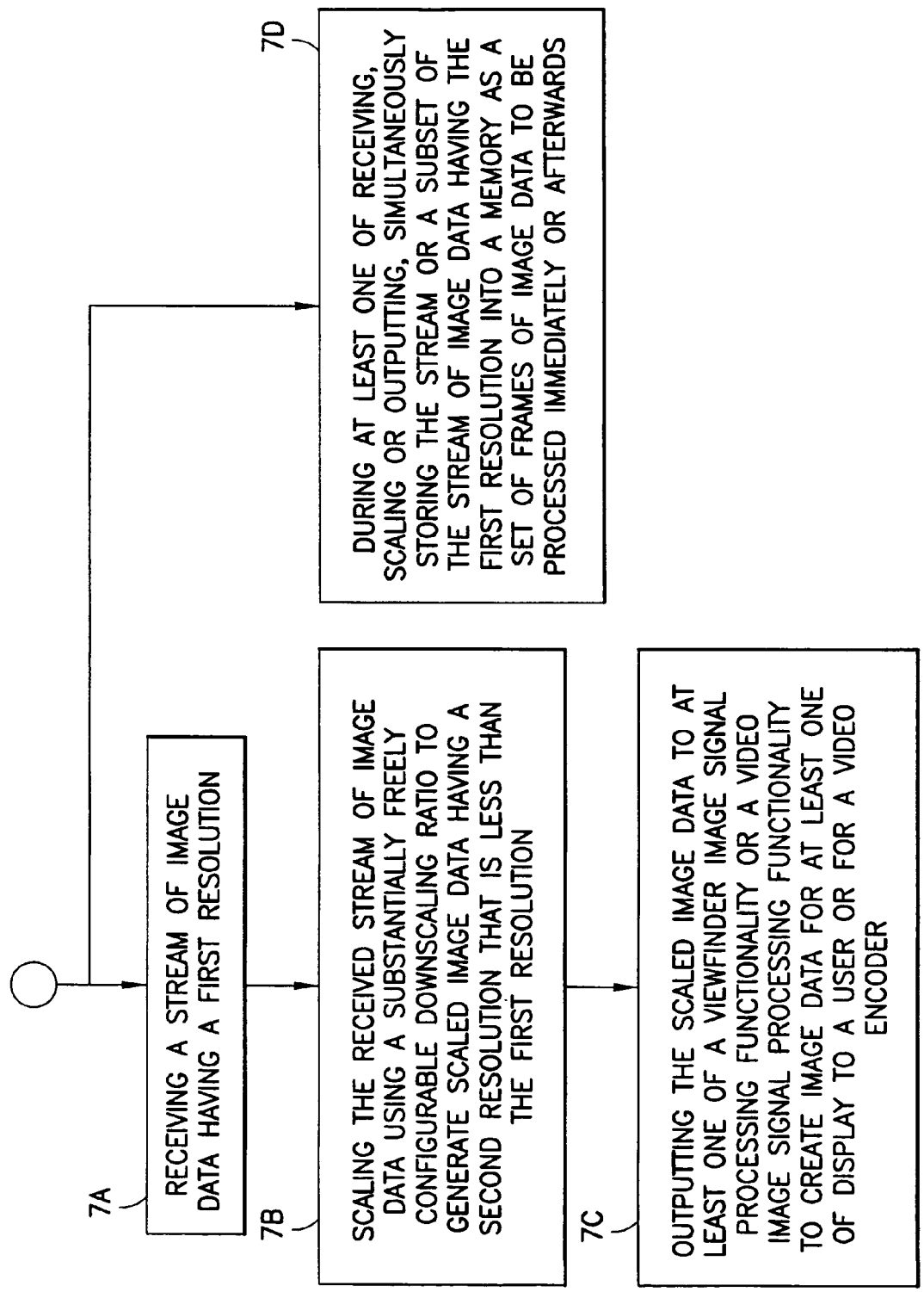
FIG. 7 is a logic flow diagram that illustrates the operation of a method, and a result of execution of computer program instructions, in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of receiving a stream of image data having a first resolution. At Block 7B there is a step of scaling the received stream of image data using a substantially freely configurable downscaling ratio to generate scaled image data having a second resolution that is less than the first resolution. At Block 7C there is a step of outputting the scaled image data to at least one of a viewfinder image signal processing functionality or a video image signal processing functionality to create image data for at least one of display to a user or for a video encoder. At Block 7D there is a step, performed during at least one of receiving, scaling or outputting, of simultaneously storing the stream or a subset of the stream of image data having the first resolution into a memory as a set of frames of image data.

In accordance with a further aspect of the method shown in FIG. 7 the operations of receiving, scaling, outputting and storing are performed in an integrated circuit that is separate from a camera module that sources the stream of image data having the first resolution.

In accordance with a further aspect of the method shown in FIG. 7 the operations of receiving, scaling and outputting are performed in a camera module that sources the stream of image data, and where storing is performed in an integrated circuit that is separate from the camera module.

In accordance with a further aspect of the method shown in FIG. 7, and described in the preceding paragraphs, where the stream of image data is received via a buffer memory.

In accordance with a further aspect of the method shown in FIG. 7, and described in the preceding paragraphs, where the step of outputting outputs the scaled image data via a buffer memory.

In accordance with a further aspect of the method shown in FIG. 7, and described in the preceding paragraphs, where there are a plurality of frames of image data stored in a plurality of frame buffers, and further comprising, in response to an image capture signal generated by the user, processing a latest stored frame as a captured still image.

In accordance with a further aspect of the method shown in FIG. 7, and described in certain of the preceding paragraphs, where there are a plurality of frames of image data stored in a plurality of frame buffers, and further comprising, in response to an image capture signal generated by the user, storing at least one further frame of image data into at least one further frame buffer, and processing the contents of the plurality of frame buffers and the at least one further frame buffer to create a time series of still images.

In accordance with a further aspect of the method shown in FIG. 7, and described in certain of the preceding paragraphs, where there are a plurality of frames of image data stored in a plurality of frame buffers, and further comprising, in response to an image capture signal generated by the user, processing the contents of the plurality of frame buffers with a multi-frame stabilization algorithm to create a stabilized still image.

In accordance with a further aspect of the method shown in FIG. 7, and described in certain of the preceding paragraphs, where a frame of image data or a set of frames of image data having the first resolution is stored into the memory while at least one of the viewfinder image signal processing functionality or the video encoder is active; and further comprising processing, at the same time or at a subsequent time, the stored frame or set of stored frames to form a captured still image or set of captured still images.

In accordance with a further aspect of the method shown in FIG. 7, and described in the preceding paragraphs, where the scaled image data that is output is one of co-sited RGB image data or Bayer image data.

In accordance with a further aspect of the method shown in FIG. 7, there is a step of further processing the image data stored in the memory to generate at least one still image.

An aspect of the exemplary embodiments is a computer-readable memory medium that stores computer software instructions, where the execution of the instructions results in performing the method of FIG. 7 as described in the preceding paragraphs.

The various blocks shown in FIG. 7 may be viewed as method steps, and/or as operations that result from operation of computer program code, and/or as a plurality of coupled logic circuit elements constructed to carry out the associated function(s).

The exemplary embodiments also provide an apparatus that comprises an image data scaler comprising an input configured to receive a stream of image data having a first resolution. The image data scaler supports substantially freely configurable downscaling ratios and configured to scale the received stream of image data to generate scaled image data having a second resolution that is less than the first resolution. The apparatus further comprises an output configured to output the scaled image data to at least one of a viewfinder image signal processing functionality or video image signal processing functionality to create image data for at least one of display to a user or for a video encoder. The apparatus also comprises a memory configured to store, simultaneously with the operation of the image data scaler, the stream of image data or a subset of the stream of image data having the first resolution as a set of frames of image data.

The exemplary embodiments also provide an apparatus that comprises a camera module that comprises an array of light sensors that generate a stream of image data having a first resolution and an image data scaler configurable to use a downscaling ratio that is substantially freely configurable. The image data scaler comprises an input configured to receive the stream of image data having the first resolution and is configured to scale the received stream of image data to generate scaled image data having a second resolution that is less than the first resolution. The image data scaler also has an output. The apparatus further comprises at least one of a viewfinder image signal processing functionality or a video image signal processing functionality having an input connected with the output of the image data scaler and configured to process the scaled image data having the second resolution. The apparatus also comprises a memory configured to store, simultaneously with operation of the image data scaler, the stream or a subset of the stream of image data having the first resolution as a set of frames of image data. The apparatus also includes a still image signal processing functionality having an input connected with the memory and configured to create still image data based on the stored image data having the first resolution.

In the apparatus as described in the preceding paragraphs, where just the image data scaler can comprises a part of the camera module, or where just the image data scaler and the viewfinder and/or video image signal processing functionality comprise a part of the camera module, or where just the image data scaler and the memory comprise a part of the camera module, or where just the image data scaler, the viewfinder and/or video image signal processing functionality and the memory comprise a part of the camera module, as non-limiting examples.

In the apparatus as described in the preceding paragraphs, where the memory is comprised of a plurality of frame buffers and further comprising a frame buffer control configured to selectively store frames of image data into individual ones of the frame buffers for processing by the still image signal processing functionality in response to image capture events generated by a user. In the apparatus the operation of the viewfinder and/or video image signal processing functionality can occur in parallel with operation of the still image signal processing functionality such that at least a viewfinder image can be displayed to the user without interruption during still image capture events.

In the apparatus as described in the preceding paragraphs, and further comprising a post-scaler coupled to an output of the viewfinder and/or video image signal processing functionality and configured to process the output of the viewfinder and/or video image signal processing functionality to provide post-scaled image data having a third resolution.

The exemplary embodiments also provide an apparatus that comprises means for receiving a stream of image data having a first resolution, for scaling the received stream of image data using a downscaling ratio that is substantially freely configurable to generate scaled image data having a second resolution that is less than the first resolution, and for outputting the scaled image data to a viewfinder and/or video image signal processing means to create image data for display to a user. The apparatus further comprises means for storing the stream of image data as a frame of image data contemporaneously with the operation of the means for receiving, scaling and outputting.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, the various image resolutions, FPS, numbers of frame buffers 14A, types of scaling operations and the like are exemplary, and the embodiments of this invention are not limited for use with only the specifically disclosed image resolutions, FPS, numbers of frame buffers 14A and types of scaling operations.

It should be noted that the terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, some of the features of the various non-limiting and exemplary embodiments of this invention may be used to advantage without the corresponding use of other features.

As such, the foregoing description should be considered as merely illustrative of the principles, teachings and exemplary embodiments of this invention, and not in limitation thereof.

What is claimed is:

1. A method, comprising:
receiving a stream of image data having a first resolution;
scaling the received stream of image data using a substantially freely configurable downscaling ratio to generate scaled image data having a second resolution that is less than the first resolution;
outputting the scaled image data to at least one of a viewfinder image signal processing functionality or a video image signal processing functionality to create image data for at least one of display to a user or to provide to a video encoder; and
during at least one of receiving, scaling or outputting, simultaneously storing the stream or a subset of the stream of image data having the first resolution into a memory as a set of frames of image data to be processed immediately or afterwards,
where there are a plurality of frames of image data stored in a plurality of frame buffers, and further comprising, in response to an image capture signal generated by the user, storing at least one further frame of image data into at least one further frame buffer, and processing the contents of the plurality of frame buffers and the at least one further frame buffer to create a time series of still images.

2. The method of claim 1, where receiving, scaling, outputting and storing are performed in an integrated circuit that is separate from a camera module that sources the stream of image data having the first resolution.

3. The method of claim 1, where receiving, scaling and outputting are performed in a camera module that sources the stream of image data, and where storing is performed in an integrated circuit that is separate from the camera module.

4. The method as in claim 1, where outputting outputs the scaled image data via a buffer memory.

5. The method as in claim 1, further comprising, in response to an image capture signal generated by the user, processing a latest stored frame as a captured still image.

6. The method as in claim 1, further comprising, in response to an image capture signal generated by the user, processing the contents of the plurality of frame buffers with a multi-frame stabilization algorithm to create a stabilized still image.

7. The method as in claim 1, where a frame of image data or a set of frames of image data having the first resolution is stored into the memory while at least one of the viewfinder image signal processing functionality or the video encoder is active; and further comprising processing, at the same time or at a subsequent time, the stored frame or set of stored frames to form a captured still image or set of captured still images.

8. The method as in claim 1, where the scaled image data that is output is one of co-sited RGB image data or Bayer image data.

9. The method of claim 1, further comprising processing the image data stored in the memory to generate at least one still image.

10. A non-transitory computer-readable memory medium storing computer software instructions, the execution of which results in performing the method as in claim 1.

11. An apparatus, comprising:
an image data scaler comprising an input configured to receive a stream of image data having a first resolution, the image data scaler supporting substantially freely configurable downscaling ratios and configured to scale the received stream of image data to generate scaled image data having a second resolution that is less than the first resolution, and further comprising an output configured to output the scaled image data to at least one of a viewfinder image signal processing functionality or video image signal processing functionality to create image data for at least one of display to a user or provide to a video encoder; and
a memory configured to store, simultaneously with the operation of the image data scaler, the stream of image data or a subset of the stream of image data having the first resolution as a set of frames of image data to be processed immediately or afterwards,
where there are a plurality of frames of image data stored in a plurality of frame buffers, and further comprising, responsive to an image capture signal generated by the user, storing at least one further frame of image data into at least one further frame buffer, and an image signal processor configured to process the contents of the plurality of frame buffers and the at least one further frame buffer to create a time series of still images.

12. The apparatus as in claim 11, where said image data scaler and said memory comprise part of an integrated circuit that is separate from a camera module that comprises an array of light sensors that generate the stream of image data having the first resolution.

13. The apparatus as in claim 11, where said image data scaler comprises part of a camera module that comprises an array of light sensors that generate the stream of image data having the first resolution, and where said memory comprises part of an integrated circuit that is separate from the camera module.

14. The apparatus as in claim 11, further comprising a buffer memory interposed between the output of the image data scaler and the at least one of the viewfinder or video image signal processing functionality.

15. The apparatus as in claim 11, further comprising, responsive to an image capture signal generated by the user, an image signal processor configured to process a latest stored frame as a captured still image.

16. The apparatus as in claim 11, further comprising, responsive to an image capture signal generated by the user, an image signal processor configured to process the contents of the plurality of frame buffers with a multi-frame stabilization algorithm to create a stabilized still image.

17. The apparatus as in claim 11, where a frame of image data or a set of frames of image data having the first resolution is stored into the memory while at least one of the viewfinder image signal processing functionality or the video encoder is active;

and further comprising processing, at the same time or at a time subsequent to the time that at least one of the viewfinder image signal processing functionality or the video encoder is active, the stored frame or set of stored frames to form a captured still image or set of captured still images.

18. The apparatus as in claim 11, where the scaled image data that is output is comprised of one of co-sited RGB image data or Bayer image data.

19. The apparatus as in claim 11, where the image data scaler is implemented at least in part with a computer-readable memory medium storing computer software instructions, the execution of which results in performing a scaling function.

20. The apparatus as in claim 13, where the camera module is configured to output scaled image data having the second resolution to the at least one of the viewfinder image signal processing functionality or the video image signal processing functionality, and is further configured to output image data having the first resolution for storage in a frame buffer that comprises a part of the memory.

21. An apparatus, comprising:
a camera module that comprises an array of light sensors that generate a stream of image data having a first resolution;
an image data scaler configurable to use a downscaling ratio that is substantially freely configurable, said image data scaler comprising an input configured to receive the stream of image data having the first resolution, the image data scaler configured to scale the received stream of image data to generate scaled image data having a second resolution that is less than the first resolution and further comprising an output;
at least one of a viewfinder image signal processing functionality or a video image signal processing functionality having an input connected with the output of the image data scaler and configured to process the scaled image data having the second resolution;

a memory configured to store, simultaneously with operation of the image data scaler, the stream or a subset of the stream of image data having the first resolution as a set of frames of image data; and a still image signal processing functionality having an input connected with the memory and configured to create still image data based on the stored image data having the first resolution, where the memory is comprised of a plurality of frame buffers, and further comprising a frame buffer control configured to selectively store frames of image data into individual ones of the frame buffers for processing by the still image signal processing functionality in response to image capture events generated by a user, and where operation of the at least one of the viewfinder image signal processing functionality or video image signal processing functionality occurs in parallel with operation of the still image signal processing functionality such that at least a viewfinder image can be displayed to the user without interruption during still image capture events.

22. The apparatus of claim 21, where the image data scaler comprises a part of the camera module.

23. The apparatus of claim 21, where the image data scaler and the at least one of the viewfinder image signal processing functionality or video image signal processing functionality image signal processing functionality comprise a part of the camera module.

24. The apparatus of claim 21, where the image data scaler and the memory comprise a part of the camera module.

25. The apparatus of claim 21, where the image data scaler, and at least one of the viewfinder image signal processing functionality or video image signal processing functionality image signal processing functionality and the memory comprise a part of the camera module.

26. The apparatus as in claim 21, and further comprising a post-scaler coupled to an output of at least one of the viewfinder image signal processing functionality or video image signal processing functionality and configured to process the output to provide post-scaled image data.

* * * * *